United States Patent [19]

Piatt et al.

[11] Patent Number: 4,473,830

[45] Date of Patent: Sep. 25, 1984

[54] INK JET PRINT HEAD

[75] Inventors: Michael J. Piatt, Englewood; Mark C. Bowers; Mark E. Brown, both of Dayton, all of Ohio

[73] Assignee: Eastman Kodak Company, Rochester, N.Y.

[21] Appl. No.: 457,772

[22] Filed: Jan. 13, 1983

[51] Int. Cl.³ .............................................. G01D 18/00

[52] U.S. Cl. .................................. 346/75; 346/140 R

[58] Field of Search .................................. 346/75, 140

[56] References Cited

U.S. PATENT DOCUMENTS

| | | | |
|---|---|---|---|
| 3,667,678 | 6/1972 | Haskell | 239/102 |
| 3,701,998 | 10/1972 | Mathis | 346/75 |
| 3,739,393 | 6/1973 | Lyon | 346/75 X |
| 3,761,941 | 9/1973 | Robertson | 346/1 |
| 3,815,129 | 6/1974 | Sweany | 340/388 |
| 4,047,183 | 9/1977 | Taub | 346/1 |
| 4,417,256 | 11/1983 | Fillmore | 346/75 |

FOREIGN PATENT DOCUMENTS 0039772 11/1981 European Pat. Off. .

*Primary Examiner*—Joseph W. Hartary
*Attorney, Agent, or Firm*—Biebel, French & Nauman

[57] ABSTRACT

An ink jet print head includes a manifold defining a fluid receiving reservoir, and an orifice plate mounted on the manifold and defining a plurality of orifices which communicate with the reservoir. Fluid flows through the orifices and emerges as fluid filaments which break up into jet drop streams. A stimulator transducer contacts the orifice plate and, upon receipt of a drive signal, vibrates the orifice plate so as to cause bending waves to travel along the plate. The bending waves stimulate the breakup of the jet drop streams. A sensor transducer is mounted on the orifice plate at the opposite end thereof from the stimulator transducer. The sensor transducer produces an electrical feedback signal which is proportional in amplitude to the amplitude of the bending waves. This feedback signal is used by a drive circuit to control the amplitude of the drive signal applied to the stimulator transducer. The sensor transducer is calibrated by observing the breakup of jet drop streams as the drive signal is varied, and when an optimum breakup is observed, the output of the sensor transducer is adjusted to a predetermined amplitude level. This adjustment is made by applying D.C. pulses of proper polarity to the sensor transducer, poling the piezoelectric transducer.

16 Claims, 5 Drawing Figures

INK JET PRINT HEAD

BACKGROUND OF THE INVENTION

The present invention relates to fluid jet print heads and, more particularly, to a print head of the type in which jet drop breakup is stimulated by bending waves which travel along an orifice plate.

Ink jet print heads are known in which the print head defines one or more rows of orifices which receive an electrically conductive recording fluid, such as for instance a water base ink, from a pressurized fluid supply manifold and eject the fluid in rows of parallel streams. Printers using such print heads accomplish graphic reproduction by selectively charging and deflecting the drops in each of the streams and depositing at least some of the drops on a print receiving medium, while others of the drops strike a drop catcher device.

In one type of ink jet printer, as shown in U.S. Pat. No. 3,701,998, issued Oct. 31, 1972, to Mathis, the print head includes a manifold, defining a fluid receiving reservoir, to which is bonded a relatively thin orifice plate, defining the rows of orifices. The orifice plate is made of stainless steel or nickel coated beryllium-copper and is somewhat flexible. The orifice plate is bonded to the manifold at the periphery of the orifice plate such that it bridges and closes the manifold opening leading to the reservoir. As a consequence, the orifices in the orifice plate are in direct fluid communication with the reservoir.

As fluid is applied under pressure to the fluid receiving reservoir, it flows through the orifices and emerges from each orifice as a fluid filament. The fluid filament then breaks at its tip into a succession of fluid drops. Left to natural stimulating disturbances, the filaments would break up erratically into drops of various sizes at irregular intervals. As can be appreciated, in order to provide precise charging of the drops as they are formed, it is important that the drop breakup process be uniform and that drops of substantially constant size and spacing are formed in each stream.

In order to produce such uniform breakup of the fluid filaments, it is known to vibrate the orifice plate at one end with an electromechanical transducer, such as a piezoelectric transducer, thus producing a series of blending waves which travel along the plate. These waves cause each of the orifices to vibrate, producing pressure varicosities in the fluid filaments emerging from the orifices, and resulting in drops of relatively uniform size and spacing being formed from the fluid filaments.

It will be appreciated that it is desirable to be able to replace the print head in a printer during servicing without replacing the electromechanical stimulator transducer. A problem has been noted, however, in that the amplitude of the mechanical vibrations required for optimum stimulation has been found not to be uniform. Thus, stimulating each of a number of print heads with a transducer driven at a single vibrational amplitude level results in at least some of the print heads producing jet drop streams which are either over stimulated or under stimulated. As a consequence, installation of a replacement print head in the field has required that a technician making the installation monitor the breakup of the jets and adjust the driving signal to the transducer accordingly. This is somewhat difficult to accomplish in the field and, additionally, provides no assurance that optimum stimulation will be provided over an extended period of operation of the print head.

It has been seen, therefore, that there is a need for print heads which are readily interchangeable, and in which optimum stimulation is maintained over extended periods of operation of the print heads.

SUMMARY OF THE INVENTION

An ink jet print head for producing a plurality of jet drop streams includes a manifold means which defines a fluid receiving reservoir to which ink is applied under pressure. An orifice plate is mounted on the manifold means and defines a plurality of orifices. The orifices communicate with the fluid receiving reservoir such that fluid from the reservoir flows through the orifices and emerges therefrom as fluid filaments. A stimulator means is mounted in contact with the orifice plate at one end thereof for vibrating the orifice plate in response to an electrical drive signal to produce bending waves which travel along the orifice plate from the point of contact of the stimulator means toward the opposite end of the plate. Bending waves of a desired amplitude cause the breakup of the filaments into streams of drops of substantially uniform size and spacing.

A sensor means is mounted on the orifice plate at the end thereof opposite the stimulator means and provides an electrical feedback signal in dependence upon the amplitude of the bending waves reaching the sensor means. A stimulator driver means is responsive to the feedback signal for providing the drive signal to the stimulator means, the amplitude of the drive signal being such that bending waves of the desired amplitude are generated in the orifice plate.

The sensor means provides an electrical feedback signal of a predetermined amplitude upon sensing bending waves of the desired amplitude in the orifice plate. The sensor means comprises a piezoelectric transducer bonded to the orifice plate.

The fluid receiving reservoir is elongated, and the orifice plate is mounted on the manifold means so as to define an elongated, flexible region which includes the orifices. Bending waves may pass along the elongated region. The sensor means is bonded to the orifice plate in the region, preferably adjacent an edge of the region so as not to reflect the bending waves back toward the stimulator means. The orifice plate may define a pair of rows of orifices, which rows extend parallel to the direction of the elongation of the reservoir. The sensor means may be mounted closer to a lateral edge of the region than the rows of orifices.

The sensor means may comprise a piezoelectric transducer bonded to the orifice plate, an electrical conductor soldered to the side of the transducer opposite the orifice plate and connected electrically to the stimulator driver means, and insulator means covering the piezoelectric transducer to preclude shorting of the transucer by moisture accumulation on the transducer.

The sensor means may further comprise an electrically conductive shield for shielding the electrical conductor from electromagnetic radiation which would otherwise alter the amplitude of the feedback signal. The stimulator driver means may comprise oscillator means for providing an A.C. signal, comparator means for comparing the feedback signal to a reference signal and for providing a gain control signal, and gain control signal means, responsive to the A.C. signal and the gain control signal, for providing the drive signal to the stimulator means. The drive signal has an amplitude which is determined by the gain control signal from the comparator means.

The method of producing a plurality of jet drop streams using a print head having a manifold defining a fluid receiving reservoir, and an orifice plate, mounted on the manifold, the orifice plate defining a plurality of orifices communicating with the reservoir, includes the steps of:

applying fluid to the reservoir under pressure so as to produce fluid flow through the orifices, fluid emerging from the orifices as fluid filaments, applying mechanical stimulation to one end of the orifice plate so as to cause bending waves to travel along the plate, thereby causing breakup of the fluid filament into drops, sensing the amplitude of the bending waves reaching the end of the orifice plate opposite the end of the plate to which mechanical stimulation is applied, and adjusting the amplitude of the stimulation applied to the orifice plate in response to the amplitude of the bending waves reaching the end of the plate opposite the end of which mechanical stimulation is applied, whereby mechanical stimulation of an amplitude sufficient to produce breakup of the filaments into streams of drops of relatively uniform size and spacing is applied to the fluid filaments.

The method of making a print head for producing a plurality of jet drop streams comprises the steps of:

mounting an orifice plate, defining a plurality of orifices, on a manifold such that the orifices communicate with a fluid reservoir within the manifold, mounting a sensor transducer at a first end of the orifice plate, the transducer providing an electrical feedback signal in response to bending waves traveling along the orifice plate, the amplitude of the feedback signal being directly related to the amplitude of the bending waves, supplying fluid to the fluid receiving reservoir so as to cause fluid flow through the orifices, the fluid emerging from the orifices as fluid filaments, applying mechanical stimulation to a second end of the orifice plate, opposite the first end, such that bending waves travel along the orifice plate from the second end to the first end and cause breakup of the fluid filaments into jet drop streams, adjusting the amplitude of the mechanical stimulation applied to the orifice plate until optimum breakup of the jet drop streams is observed, and adjusting the amplitude of the feedback signal provided by the sensor transducer to a predetermined level, whereby the sensor transducer will provide a feedback signal of the predetermined level during subsequent operation of the print head when the amplitude of the mechanical stimulation is such as to produce optimum breakup.

The sensor transducer may be a piezoelectric transducer and the step of adjusting the feedback signal may comprise the step of applying unidirectional pulses to the piezoelectric transducer of a proper polarity to adjust the feedback signal amplitude to the predetermined level.

Accordingly, it is an object of the present invention to provide a print head and methods of making and operating a print head in which the mechanical stimulation of the print head orifice plate is maintained at a desired amplitude, causing breakup of fluid filaments into streams of drops of substantially uniform size and spacing; to provide such a print head and methods in which the amplitude of the bending waves generated in the orifice plate is sensed and the electrical drive signal to the stimulator transducer is adjusted in response thereto; to provide such a print head and methods in which a piezoelectric transducer is mounted on the print head orifice plate to sense the amplitude of bending waves which travel along the plate; and to provide such a print head and methods in which the piezoelectric transducer is poled to provide a feedback signal of a predetermined level when bending waves of a desired amplitude are sensed.

Other objects and advantages of the invention will be apparent from the following description, the accompanying drawings and the appended claims.

DETAILED DESCRIPTION OF THE PREFERRED EMBODIMENTS

Figure 1:
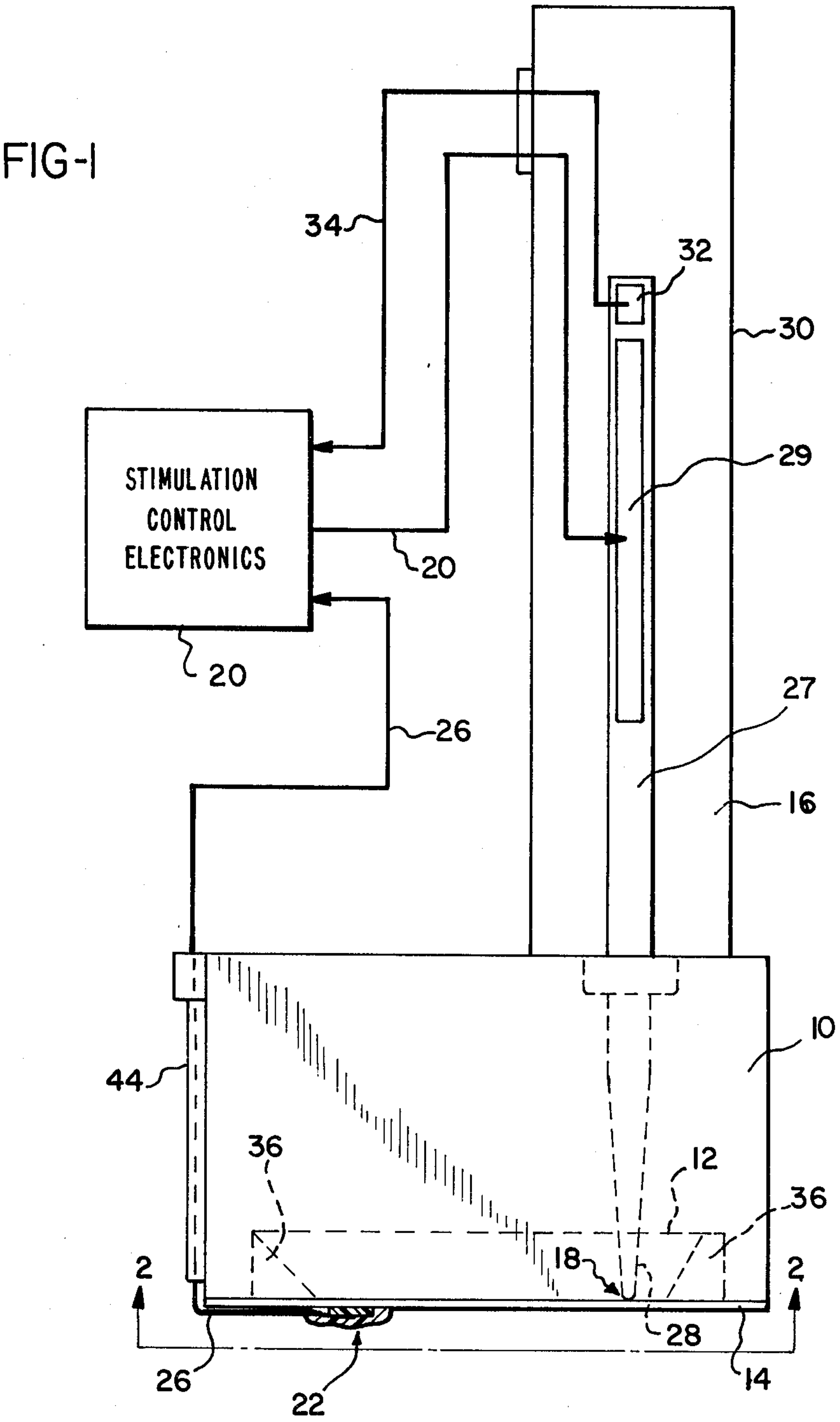
FIG. 1 is a front view of the ink jet print head of the present invention, with the sensor transducer in section.
Figure 2:
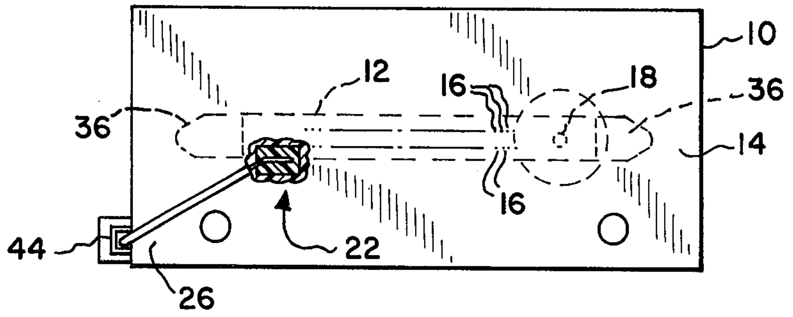
FIG. 2 is a bottom view of the print head of FIG. 1, taken generally along line 2—2 in FIG. 1, with the sensor transducer in section.

The present invention relates to fluid jet print heads and, more particularly, to a print head of the type in which jet stimulation is accomplished by subjecting an orifice plate to bending waves which travel along the plate. As seen in FIG. 1, the print head includes a manifold means 10 which defines a fluid receiving reservoir 12 to which ink is applied under pressure. Reservoir 12, as illustrated in FIG. 2, is elongated and may be tapered at its ends. Fluid supply conduits (not shown) are provided in the manifold 10 to permit the application of ink to the reservoir 12 under a pressure in excess of atmospheric pressure.

An orifice plate 14 is mounted on the manifold means 10 and defines a plurality of orifices 16 which communicate with the fluid receiving reservoir 12. Fluid from the reservoir flows through the orifices 16 and emerges therefrom as fluid filaments. As seen in FIG. 2, the orifices may advantageously be arranged in one or more rows which extend generally parallel with the direction of elongation of the reservoir 12.

A stimulator means 16 is mounted in contact with the orifice plate 14 at 18. The stimulator means 16 vibrates the orifice plate 14 in response to an electrical drive signal supplied on line 20 and produces bending waves which travel along the orifice plate from the point of contact 18 toward the opposite end of the plate. As is known, these bending waves cause the fluid filaments which emerge from the orifices 16 to break up into streams of drops of substantially uniform size and spacing.

It is also known that the lengths of the fluid filaments are dependent, in part, upon the amplitude of these bending waves. In general, high amplitude bending waves moving along the orifice plate 14 will result in shorter fluid filaments than would be the case with lower amplitude bending waves. As mentioned previously, control of the trajectories of the drops in the streams is accomplished by selectively charging the drops by means of charging electrodes which are positioned adjacent the points of breakup of the streams. If the amplitude of the bending waves is either too high or too low, the fluid filament lengths will be either too short or too long and, therefore, the points of breakup of the streams will not be adjacent the charging electrodes.

Simply providing a constant amplitude stimulation to the orifice plate at point 18 does not insure that the necessary amplitude of stimulation energy is being applied to the fluid filaments. It has been found that the amplitude of the transducer drive signal necessary to produce breakup of the jet drop streams in an optimum fashion varies from print head to print head and from transducer to transducer. In order to sense the amplitude of the bending waves which travel along the orifice plate, and provide a means by which the stimulation control electronics 20 may determine whether transducer 16 is being under driven or over driven, a sensor means 22 including a piezoelectric transducer 24 is mounted on the orifice plate 14 at the end thereof opposite the stimulator means 16. The sensor means 22 provides an electrical feedback signal to electronics 20 on line 26. The amplitude of the electrical feedback signal is dependent upon the amplitude of the bending waves which reach the sensor. The electronics 20 acts as a stimulation driver means which is responsive to the feedback signal 26 for providing the driving signal on line 20 to the stimulator means.

The sensor 22 provides an electrical feedback signal of a predetermined amplitude on line 26 upon sensing bending waves of the desired amplitude in the orifice plate 14. As discussed more fully below, the sensor means is adjusted in a calibration operation at the time that a print head according to the present invention is constructed. Each such print head provides a feedback signal of the same predetermined amplitude whenever the optimum amplitude of bending waves for that individual print head is obtained. Thus, print heads constructed and calibrated according to the present invention are interchangeable with each other and piezoelectric stimulators may be changed in such print heads without effecting print head operation.

As seen in FIG. 1, the piezoelectric stimulation transducer includes a rod 27 which has a tapered tip 28 which extends into the reservoir 12 through the manifold 10 and which is vibrated vertically at a relatively high frequency, on the order of 48 KHz, by means of a piezoelectric crystal element 29 mounted on one side and an identical crystal element (not shown) mounted on the opposite side of the rod 27. The rod 27 is supported within casing 30 by pins (not shown) at a nodal point along its length. A feedback transducer 32, also a piezoelectric element, supplies a signal to the electronics 20 via line 34. As discussed more completely below, the feedback signal on line 34 is utilized for control of the frequency of the drive signal on line 20 such that the stimulator transducer is driven at or near its resonant frequency. The disclosed stimulator transducer is the subject of copending application Serial No. 453,082 filed 12/27/82, assigned to the assignee of the present invention. It should be appreciated, however, that any of a number of known transducers may be used in the print head of the present invention.

As will be appreciated, it is desired that bending waves pass along the orifice plate from the point 18 but that such bending waves not be reflected back from the opposite end of the orifice plate. If reflection were to occur, standing waves would be produced in the orifice plate and the fluid filaments would not be stimulated uniformly. In order to preclude such reflection, dampers 36 are formed in each end of the reservoir. The dampers are made of polyurethane or other similar flexible material which tends to absorb rather than reflect the bending wave energy.

The orifice plate 14 is typically adhesively bonded to the manifold 10 such that only the portion of the plate 14 which bridges the elongated reservoir 12 is free to flex and thus carry bending waves along the orifices 16. In order to preclude reflection of bending waves back toward the stimulator transducer contact point 18, the sensor means is mounted on the orifice plate adjacent an edge of the elongated flexible region of the plate. As a result, the sensor means does not interfere appreciably with the passage of the bending waves along the region. It is preferable that the sensor transducer 22 be mounted outwardly from the center of the region, closer to an edge of the region than the rows of orifices.

Figure 3:
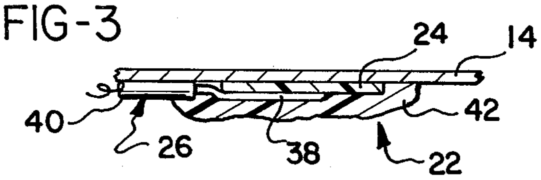
FIG. 3 is an enlarged sectional view of the sensor transducer, similar to FIG. 1.

As seen in FIG. 3, the sensor means comprises a piezoelectric transducer 24 which is bonded to the orifice plate 14 on one side thereof. Orifice plate 14 is typically electrically grounded. The opposite side of the transducer 24 has an electrical conductor 38 soldered thereto and is electrically connected via conductor 38 and line 26 to the electronics 20. The conductor 26 includes an insulating sheath 40 which prevents the conductor 38 from being shorted to the grounded orifice plate 14 or to any other grounded elements into which it comes in contact. The piezoelectric transducer 24 is coated with an insulator means 42, comprising a quantity of cured epoxy resin material which prevents the piezoelectric transducer 24 from being shorted out by the inadvertent deposit of moisture on the transducer 24.

In order to prevent the introduction of noise into the feedback signal on line 26 from the charge electrodes associated with the print head, the sheath 40 may preferably be painted with an electrically conductive paint which is grounded to the orifice plate 14 so as to shield the conductor 38. A shield tube 44, mounted on the side of the print head and made of copper, brass, or other electrically conductive material, provides additional shielding for the line 26 blocking out extraneous electromagnetic radiation which would otherwise alter the amplitude of the feedback signal on line 26.

Figure 4:
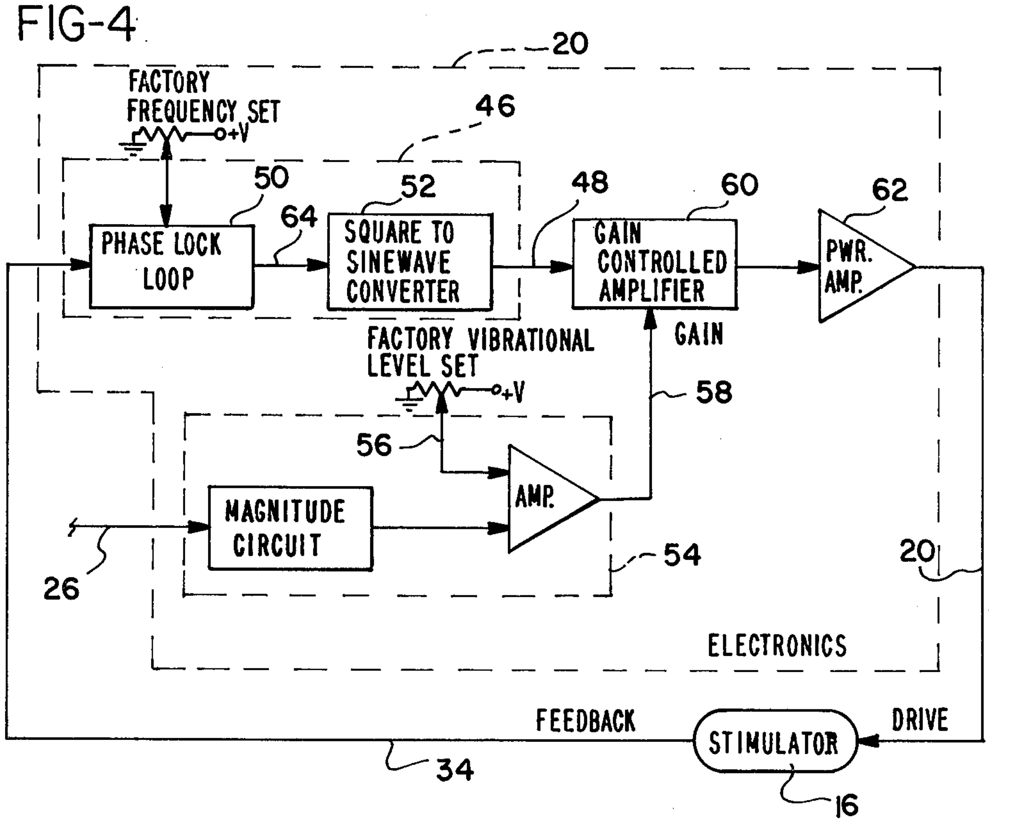
FIG. 4 is a block diagram illustrating the stimulation control electronics.

The stimulation control electronics 20 is shown in block diagram form in FIG. 4. An oscillator means 46 provides an A.C. signal on line 48 in response to the feedback signal from transducer 32 supplied by a line 34. A phase lock loop circuit is responsive to the phase of the feedback signal on line 34 so as to produce a square wave signal which is substantially at the resonant frequency of the stimulator transducer. The square wave produced by phase lock loop circuit 50 is converted by a converter circuit 52 to the A.C. signal applied to line 48. While this arrangement makes use of the frequency feedback sensor 32, it should be understood that the present invention also contemplates the use of other known stimulator transducers which are simply driven at a fixed frequency.

A comparator means 54 compares the feedback signal to a reference signal on line 56 and provides a gain control signal on line 58. A gain control amplifier means, including amplifier 60 and power amplifier 62, is responsive to the A.C. signal on line 48 and the gain control signal on line 58 for providing the drive signal on line 20 to the stimulator means 16. The drive signal has an amplitude determined by the gain control signal on line 58 from the comparator means 54.

Figure 5:
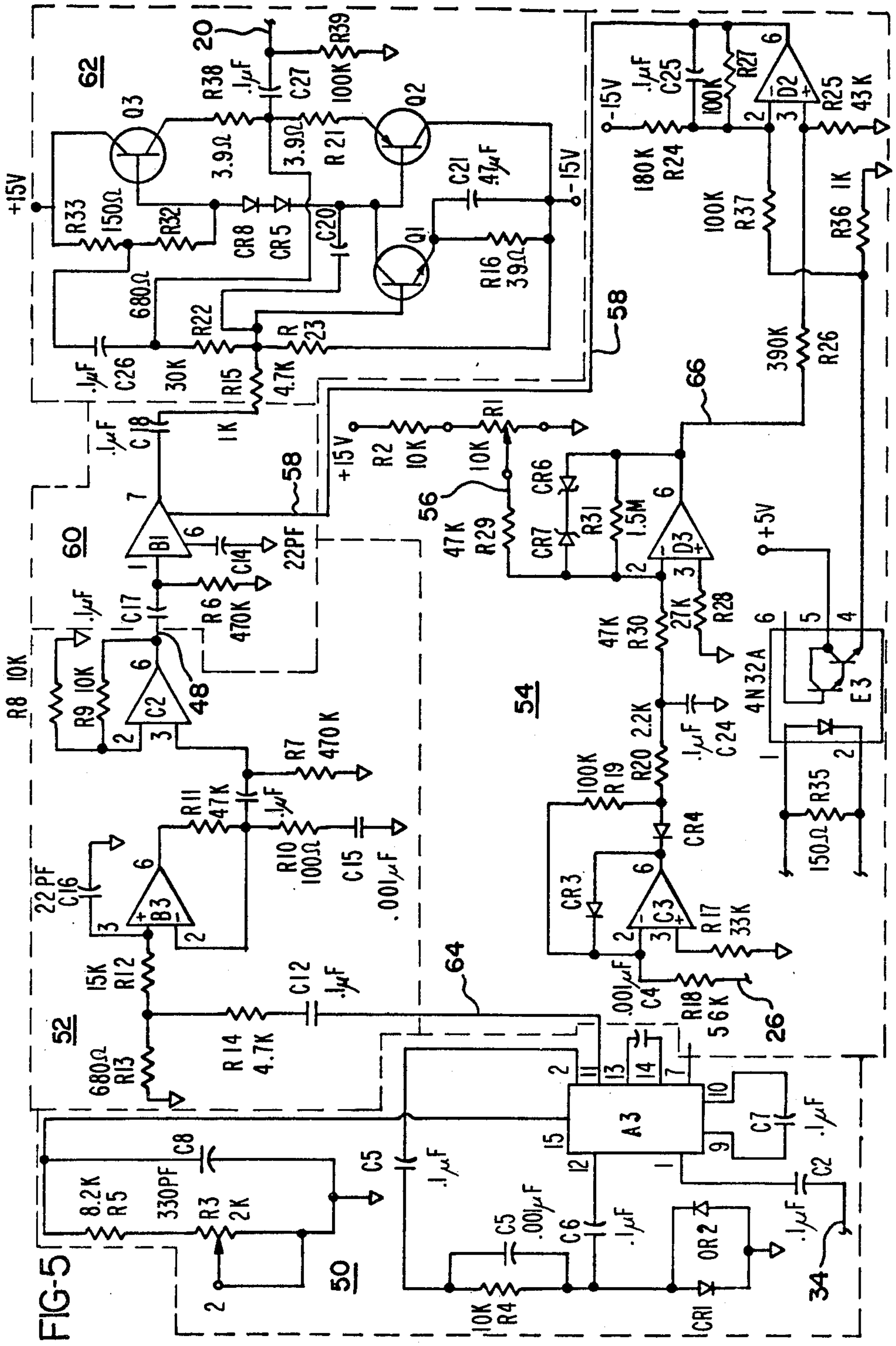
FIG. 5 is an electrical schematic diagram showing the stimulation control electronics of FIG. 4 in greater detail.

Reference is now made to FIG. 5 which discloses the stimulation control electronics of FIG. 4 in greater detail. The phase lock loop circuit 50 adjusts the output of the oscillator circuit 46 to match the resonant frequency of the stimulator transducer 16. As mentioned previously, if a different stimulator transducer, having no frequency feedback arrangement is utilized, circuit 50 and 52 may simply be replaced by a fixed frequency oscillator circuit. The A3 demodulator chip LM 1800 N adjusts its output frequency on line 64 to be −90° out of phase with the input frequency on line 34. Internally, the modulator chip LM 1800 N includes a phase detector which detects the phase relationship between the input frequency and a voltage controlled oscillator frequency. The phase detector output is used as an input to the voltage controlled oscillator to control the oscillator's output frequency. The free running frequency of the voltage controlled oscillator is determined by resistors R3, R5, and capacitor C8. Manual adjustment of the variable resistor R3 is required to set the frequency of the LM 1800 N due to manufacturing variations in the chip. The resistor R4 and capacitor C5 provide a small amount of positive phase shift to compensate for excess phase lag elsewhere in the signal path. The back-to-back diodes CR1 and CR2 limit the signal level to A3 to a maximum of 1.2 volts.

Circuit 54 compares the magnitude of the feedback signal from the sensor transducer 22 to a preset level. This comparison, producing an error signal, is used to alter the gain of the attenuator stage 60. The feedback signal on line 26 is supplied to amplifier C3, which acts as a half wave rectifier, and which supplies the detected signal to a low pass filter consisting of resistor R20 and capacitor C24.

The output of the low pass filter is supplied to an operational amplifier D3 which acts as an inverting summing amplifier with limited output voltage swing. The Zener diodes CR7 and CR6 limit the output swing to 8.2 volts. The output of this amplifier is an error signal on line 66 which is biased by a second operational amplifier D2. Amplifier D2 sums the error signal and a bias voltage to drive the electronic attenuator circuit into its normal operating region. This bias voltage is supplied by optical isolator E3 which is turned on when the system is turned on.

The square wave signal on line 64 is supplied to square to sine wave converter 52 which includes a high-gain, band pass filter formed by amplifier B3. Amplifier C2 acts as a non-inverting buffer. The output on line 48 is supplied to an attenuator B1, which preferably may be a Motorola MC3340. The output of the attenuator passes through a power amplifier stage 62, and is supplied to the stimulator means 16 via line 20.

It is desirable to calibrate the print head of the present invention in such a manner that it will operate interchangeably with other such print heads. Calibration is accomplished at the time that the print head is manufactured by a technician who places the print head in a test fixture, and observes the breakup of jet drop streams as the drive signal to a stimulator transducer is varied. When optimum breakup of the jet drop streams is observed, the feedback signal from the sensor transducer is then adjusted by the technician to a predetermined amplitude level. It will be appreciated, therefore, that when the print head is later driven by a circuit which monitors the feedback signal from the sensor transducer 22, the drive signal to the stimulator transducer may be varied as required in order to produce the same desired bending wave amplitude which was observed to produce optimum breakup of the jet drop streams.

Adjustment of the feedback signal level is accomplished by a poling technique. A D.C. pulse of relatively high voltage is applied across the transducer 22 so as to reduce the level of feedback signal which the transducer provides for a given amplitude of bending waves. Should the feedback amplitude level be reduced too much, D.C. pulses of the opposite polarity are applied across the sensor transducer 22, increasing the feedback amplitude level.

It will be appreciated that other arrangements may be provided for adjusting the feedback signal level. As an example, a potentiometer may be connected in line 26 to attenuate the voltage level of the feedback signal. Alternatively, the size of the transducer may be altered and the output supplied to a current-to-voltage converter. Since the charge/unit area of a piezoelectric transducer remains relatively constant, reducing the size of the transducer results in reducing the output current level. The converter thereafter provides a feedback signal voltage level which is proportionately reduced.

While the forms of apparatus and methods of making and operating the apparatus herein described constitute preferred embodiments of this invention, it is to be understood that the invention is not limited to these precise forms, and that changes may be made therein without departing from the scope of the invention which is defined in the appended claims.

What is claimed is:

1. An ink jet print head for producing a plurality of jet drop streams, comprising:

manifold means defining a fluid receiving reservoir to which ink is applied under pressure, an orifice plate mounted on said manifold means and defining a plurality of orifices, said orifices communicating with said fluid receiving reservoir such that fluid from said reservoir flows through said orifices and emerges therefrom as fluid filaments, stimulator means, mounted in contact with said orifice plate at one end thereof, for vibrating said orifice plate in response to an electrical drive signal to produce bending waves which travel along said orifice plate from the point of contact of said stimulator means toward the opposite end of said plate, bending waves of a desired amplitude causing breakup of said filaments into streams of drops of substantially uniform size and spacing, sensor means, mounted on said orifice plate at the end thereof opposite said stimulator means, for providing an electrical feedback signal in dependence upon the amplitude of the bending waves reaching said sensor means, and stimulator driver means, responsive to said feedback signal, for providing said drive signal to said stimulator means, the amplitude of said drive signal being such that bending waves of said desired amplitude are generated in said orifice plate.

2. The ink jet print head of claim 1 in which said sensor means provides an electrical feedback signal of a predetermined amplitude upon sensing bending waves of said desired amplitude in said orifice plate.

3. The ink jet print head of claim 2 in which said sensor means comprises a piezoelectric transducer bonded to said orifice plate.

4. The ink jet print head of claim 1 in which said fluid receiving reservoir is elongated, and in which said orifice plate is mounted on said manifold means in such a manner as to define an elongated flexible region, including said orifices, along which bending waves may pass, and, further, in which said sensor means is bonded to said orifice plate in said region.

5. The ink jet print head of claim 4 in which said sensor means is bonded to said orifice plate adjacent an edge of said region, whereby bending waves traveling along said orifice plate are not reflected back toward said stimulator means by virtue of said sensor means.

6. The ink jet print head of claim 4 in which said orifice plate defines a pair of parallel rows of orifices, said rows extending parallel to the direction of elongation of said reservoir, and in which said sensor means is mounted closer to a lateral edge of said region than said rows.

7. The ink jet print head of claim 1 in which said sensor means comprises:

a piezoelectric transducer bonded to said orifice plate, an electrical conductor soldered to the side of the transducer opposite the orifice plate and connected electrically to said stimulator driver means, said conductor having an insulating sheath therearound, and insulator means covering said piezoelectric transducer to preclude shorting of said transducer by moisture accumulation on said transducer.

8. The ink jet print head of claim 7 in which said sensor means further comprises an electrically conductive shield for shielding said electrical conductor from electromagnetic radiation which would otherwise alter the amplitude of said feedback signal.

9. The ink jet print head of claim 1 in which said stimulator driver means comprises:

oscillator means for providing an A.C. signal, comparator means for comparing said feedback signal to a reference signal and for providing a gain control signal, and gain control amplifier means, responsive to said A.C. signal and said gain control signal, for providing said drive signal to said stimulator means, said drive signal having an amplitude determined by said gain control signal from said comparator means.

10. A method of producing a plurality of jet drop streams using a print head having a manifold defining a fluid receiving reservoir, and an orifice plate, mounted on said manifold, said orifice plate defining a plurality of orifices communicating with said reservoir, comprising the steps of:

applying fluid to said reservoir under pressure so as to produce fluid flow through said orifices, said fluid emerging from said orifices as fluid filaments, applying mechanical stimulation to one end of said orifice plate so as to cause bending waves to travel along said plate, thereby causing breakup of said fluid filaments into drops, sensing the amplitude of the bending waves reaching the end of said orifice plate opposite the end of said plate to which mechanical stimulation is applied, and adjusting the amplitude of the mechanical stimulation applied to said orifice plate in response to the amplitude of the bending waves reaching the end of said plate opposite the end to which mechanical stimulation is applied, whereby mechanical stimulation of an amplitude sufficient to produce breakup of said filaments into streams of drops of relatively uniform size and spacing is applied to the fluid filaments

11. The method of claim 10 in which the step of sensing the amplitude of the bending waves reaching the end of the orifice plate opposite the end of the plate to which mechanical stimulation is applied, comprises the step of:

positioning a transducer in contact with said orifice plate adjacent the end of the orifice plate opposite the end to which mechanical stimulation is applied, said transducer providing an electrical feedback signal proportional in amplitude to the amplitude of such bending waves.

12. The method of claim 11 in which said step of positioning a transducer in contact with said orifice plate comprises the step of positioning a piezoelectric transducer in contact with said orifice plate to one side of said orifice plate so as not to interfere with said bending waves.

13. The method of claim 12 in which said piezoelectric transducer provides a feedback signal of a predetermined amplitude when bending waves of the desired amplitude travel along said orifice plate.

14. The method of claim 13 in which said piezoelectric transducer is poled so as to set the level of the feedback signal provided by the transducer at said predetermined level when the desired amplitude of bending waves travel along said orifice plate.

15. The method of making a print head for producing a plurality of jet drop streams, each stream consisting of drops of fluid of substantially uniform size and spacing, comprising the steps of:

mounting an orifice plate, defining a plurality of orifices, on a manifold such that said orifices communicate with a fluid reservoir within said manifold, mounting a sensor transducer at a first end of said orifice plate, said transducer providing an electrical feedback signal in response to bending waves traveling along said orifice plate, the amplitude of the feedback signal being directly related to the amplitude of the bending waves, supplying fluid to said fluid receiving reservoir so as to cause fluid flow through said orifices, said fluid emerging from said orifices as fluid filaments, applying mechanical stimulation to a second end of said orifice plate, opposite said first end, such that bending waves travel along said orifice plate from said second end to said first end and cause breakup of said fluid filaments into jet drop streams, adjusting the amplitude of the mechanical stimulation applied to said orifice plate until optimum breakup of said jet drop streams is observed, and adjusting the amplitude of the feedback signal provided by said sensor transducer to a predetermined level, whereby said sensor transducer will provide a feedback signal of said predetermined level during subsequent operation of said print head when the amplitude of said mechanical stimulation is such as to produce optimum breakup.

16. The method of claim 15 in which said sensor transducer is a piezoelectric transducer and in which the step of adjusting said feedback signal comprises the step of applying unidirectional pulses to said piezoelectric transducer of a proper polarity to adjust the feedback signal amplitude to said predetermined level.

* * * * *